United States Patent [19]

Hwang

[11] Patent Number: 4,980,666
[45] Date of Patent: Dec. 25, 1990

[54] TWO-STEP ALARM DISARMING DEVICE WITH AUTOMATIC REARMING FEATURE

[76] Inventor: Shih-Ming Hwang, No. 11, Alley 12, Lane 7, Ching-Tyan St., Taipei, Taiwan

[21] Appl. No.: 57,632

[22] Filed: Jun. 3, 1987

Related U.S. Application Data

[63] Continuation of Ser. No. 759,444, Jul. 26, 1985, abandoned.

[51] Int. Cl.⁵ ............................................. B60R 25/04
[52] U.S. Cl. ................................... 340/426; 307/10.2; 340/428
[58] Field of Search ............... 340/63, 64, 506–508, 340/528, 426, 428, 430; 307/10 AT, 10.2, 10.3

[56] References Cited

U.S. PATENT DOCUMENTS

| | | | |
|---|---|---|---|
| 3,866,168 | 2/1975 | McGuirk | 340/64 |
| 4,543,568 | 9/1985 | Hwang | 340/528 |
| 4,574,268 | 3/1986 | Ohnishi | 340/528 |
| 4,638,292 | 1/1987 | Mochida et al. | 340/63 |
| 4,691,801 | 9/1987 | Mann et al. | 340/63 |
| 4,706,064 | 11/1987 | Hwang | 340/63 |

FOREIGN PATENT DOCUMENTS 2423015 11/1979 France ................................. 340/63

Primary Examiner—Joseph A. Orsino
Assistant Examiner—Brent A. Swarthout
Attorney, Agent, or Firm—Lane, Aitken & McCann

[57] ABSTRACT

The invention is a two-step alarm disarming device with automatic rearming which uses sensors and buffer circuits to detect the condition of the car doors, hood, and trunk. It can disarm an alarm in two steps—with a signal input to an exterior key switch buffer for temporary disarming and a signal input to the ignition for permanent disarming. It is comprised of two-step alarm disarming circuits, a flip-flop, a timer, and a buffer for alarm disarming so that the burglar alarm can operate at maximum effectiveness without failure due to external interference or user negligence.

2 Claims, 1 Drawing Sheet

TWO-STEP ALARM DISARMING DEVICE WITH AUTOMATIC REARMING FEATURE

This a continuation of application Ser. No. 759,444 filed July 26, 1985, now abandoned.

BACKGROUND OF THE INVENTION

Generally, an automobile is equipped with a burglar alarm to prevent intrusion by a burglar. Both active and passive type burglar alarms have the following defects:

(1) The burglar alarm must be turned on when the user is going to leave his car, but it may be left off due to user negligence, negating its function;

(2) No provision exists for testing the functioning of the alarm and its circuits;

(3) The user has to quickly leave the car after turning off the alarm since the time delay is very short; and (4) The user may prefer not to test the alarm since it is very noisy.

The inventor applied for a patent for the invention "Burglar Alarm with Re-entry Feature" on March 29, 1983 Ser. No. 480,124). On Sept. 24, 1985, U.S. Pat. No. 4,543,568 was issued by the U.S. Patent Office. The said invention is characterized by the installation of sensors in the doors, hood, and trunk of a car. An exit delay period will begin when the last door is closed. Within this time period the alarm may be temporarily disarmed by again opening a door or the hood or trunk. Simultaneous with the closing of the last door a "chirp" will sound to inform the user that the doors have been properly closed, the alarm is functioning properly, and the exit delay period has begun. Once the exit delay period has expired, the alarm will be triggered by opening a door, hood, or trunk. Such an alarm increases the user's feeling of security, and is very convenient to use.

Currently, many automobile burglar alarms are operated by radio frequency, i.e., a radio frequency transmitter transmits a certain signal to disarm the alarm. A defect of most RF disarming devices is that an armed burglar alarm may be disarmed by external radio frequency signals and thus lose its intended protective function. The present invention eliminates these defects, and can rearm an alarm automatically as well as disarm an alarm in two steps.

SUMMARY OF THE INVENTION

The said invention is an alarm disarming device which is characterized by a rearming circuit and a two-step alarm disarming circuit which temporarily disarms the alarm in the first step and permanently disarms the alarm in the second step. It can rearm itself after a present time even if the alarm has not been triggered but has been interfered with by external radio frequency signals.

DESCRIPTION OF THE PREFERRED EMBODIMENTS

Figure 1:
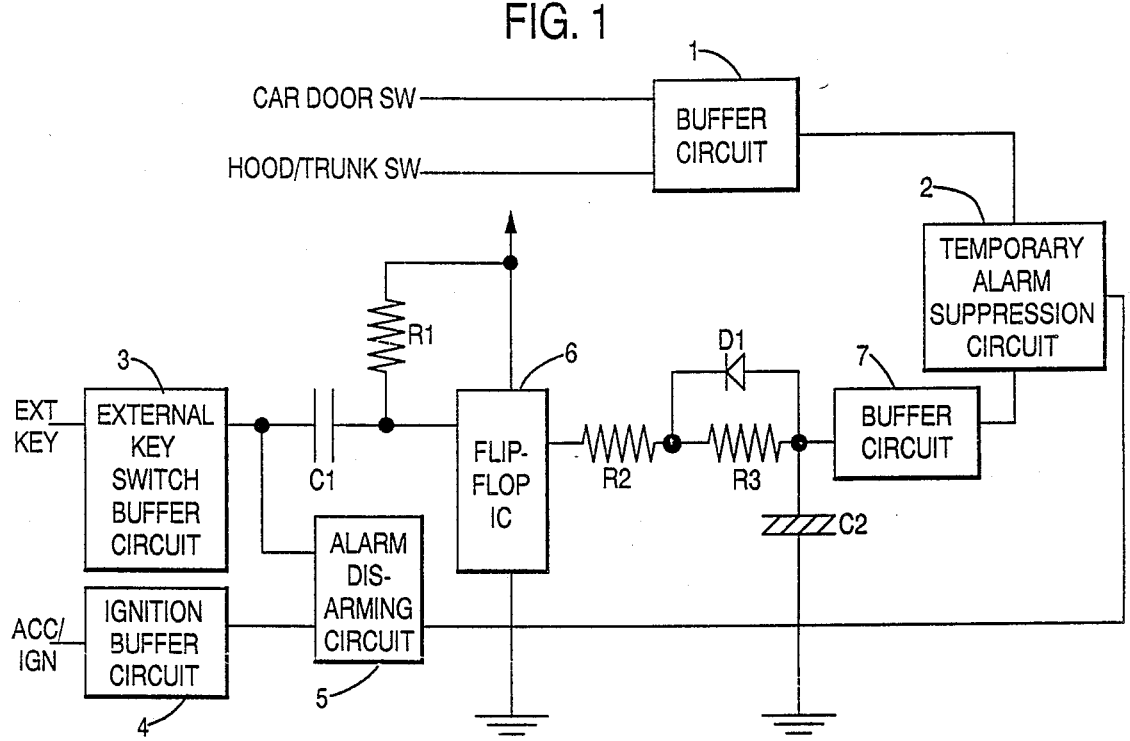
FIG. 1 is a block diargram of the present invention.

FIG. 1 is a block diagram of the invention. As shown in the drawing, the invention uses sensors installed in the car doors, hood, and trunk to detect their opening or closing. Signals from such sensors enter a buffer circuit (1) and then a temporary alarm suppression circuit (2).

Furthermore, the invention has an external key switch buffer circuit (3) which is used to disarm an alarm by radio transmitter or by key lock switch and an ignition buffer circuit (4) controlled by the ignition. The external key switch and ignition switch inputs comprise the two-step alarm disarming circuit (5). In the first step, a radio transmitter is used to disarm the alarm temporarily then opening the car door. If the door is not opened within a preset period, the circuit will re-arm, and the radio transmitter must be used again to disarm the alarm temporarily in order to open the door. In the second step, i.e., after opening the door, the car ignition must be turned on to disarm the alarm permanently. The two-step disarming circuit refers to a flip-flop IC (6) which is used to lock the temporary disarm signal. There is a timer circuit composed of $R_2$, $R_3$, and $C_2$ which sets a time limit for opening a car door after the alarm has been temporarily disarmed in the first step. That is, for a certain preset period after activating the radio transmitter, a buffer circuit (7) gives a signal input to the temporary alarm suppression circuit (2) to disarm the alarm temporarily, and then as the preset time expires, automatically rearms to prevent accidental permanent disarming of the alarm by an exterior radio signal.

Only after temporarily disarming the alarm and opening the car door in the first step, and turning on the car ignition in the second step, will the alarm be permanently disarmed. Therefore, external radio signals may disarm the alarm temporarily (first step disarming), but cannot disarm the alarm permanently (second step disarming). The alarm will automatically re-arm at a preset time after the alarm is temporarily disarmed in the first step. Therefore, the invention is free any interference due to user negligence or external forces, and can allow a burglar alarm to function at its optimum effectiveness.

Figure 2:
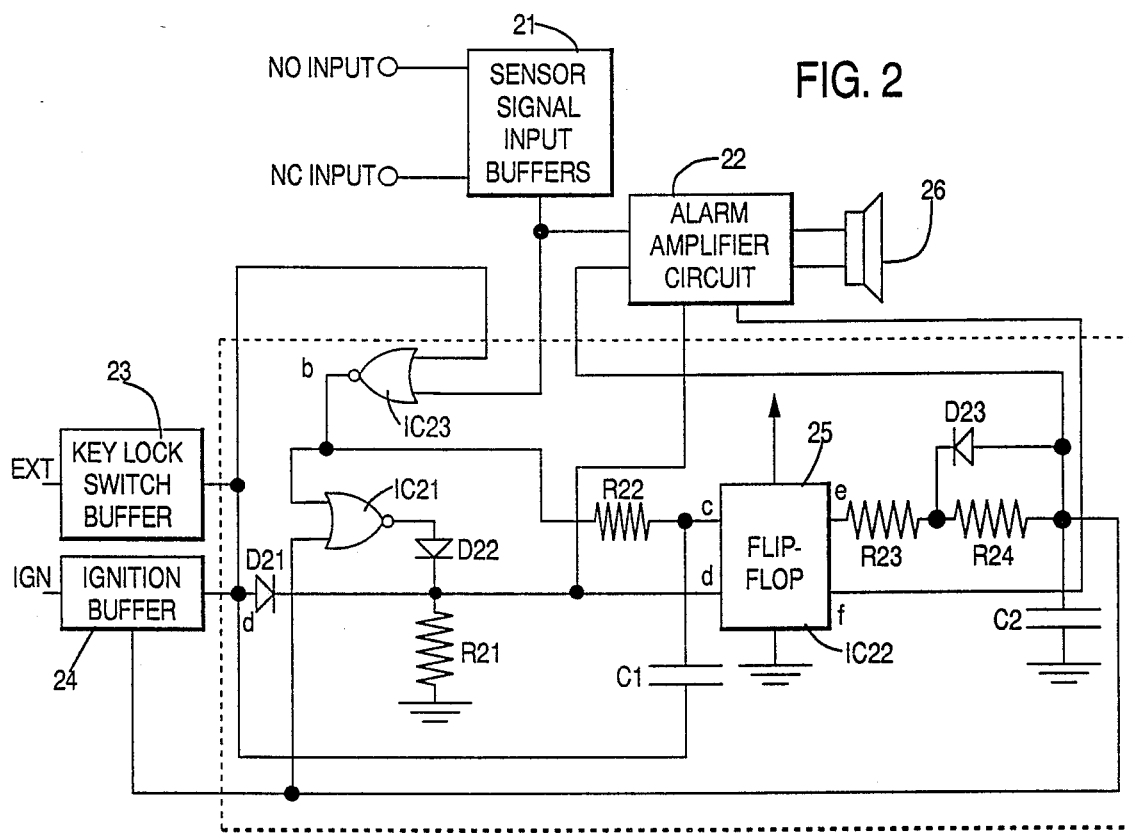
FIG. 2 is a circuit diagram for a preferred embodiment of the present invention.

FIG. 2 is a circuit diagram for another embodiment of the invention. The N.O. INPUT and N.C. INPUT are sensor signal input buffers (21) installed in the car doors, hood, or trunk. The external key lock switch input is an external key lock switch buffer (23) for receiving signals from a radio transmitter in order to remotely disarm an alarm temporarily. The ignition and ignition buffer (24) are for completely disarming the alarm after the said temporary disarming through the external key switch. Therefore, no external radio frequency signal can perform the two-step alarm disarming. When the car doors, hood, and trunk are closed, point "b" in FIG. 2 is in the logic "1" state. If the ignition has been turned on, point "a" is in the logic "1" state, and point "d" in $IC_{22}$ is also in the logic "1" state. Then, $IC_{22}$ starts the automatic reset timer and the alarm amplifier circuit (22) so that no false alarm will be given during acceleration. As soon as the car is stopped and the ignition is turned off, the output point "b" in $IC_{23}$ is in the logic "1" state, and point "c" in $IC_{22}$ is in the logic "1" state, too. $C_{21}$ then provides positive potential to $D_{21}$ and resets $IC_{22}$. After the car door is opened, the output "b" of $IC_{23}$ changes to the logic "0" state, both inputs of $IC_{21}$ are in the logic "0" state, its output is in the logic "1" state, and $IC_{22}$ is reset. After closing the last car door, if the car door is opened again within a preset time, the output at point "f" of $IC_{22}$ is in the logic "1" state, and it starts the automatic reset timer and the alarm amplifier circuit (22) so that it will not trigger the alarm. If a car door or hood or trunk is opened again after the preset time, the alarm will sound. In this way, the purpose of the alarm is achieved. As soon as the alarm is temporarily disarmed by the radio transmitter (or other external radio frequency), $R_{23}$, $R_{24}$, and $C_{22}$ set the timer for automatic rearming. After opening the car door in the first step and turning on the ignition in the second step, the alarm is completely disarmed. The disarming at the second step uses the ignition, via $D_{21}$, $IC_{21}$, $D_{22}$, and $IC_{22}$, to disarm the alarm completely. The invention is indeed an ideal alarm disarming device which will not be affected by any external interference or user negligence.

I claim:

1. An automotive vehicle burglar alarm system for an automotive vehicle having a vehicle door and an ignition system, alarm means to sound an alarm in response to the opening of a door of said vehicle when said alarm means is armed and allowing said door to be opened without sounding said alarm when said alarm means is disarmed, an external key switch buffer circuit selectively operable from outside the vehicle to generate an initial disarming signal, and two-step disarming circuit means to disarm said alarm means in response to receiving said initial disarming signal as a first step and the activation of said vehicle ignition system as a second step within a predetermined time interval after receiving said initial disarming signal, said two-step disarming circuit means temporarily disarming said alarm means during said predetermined interval and automatically rearming said alarm means at the end of said predetermined time interval if said ignition system is not activated during said predetermined time interval.

2. A vehicle burglar alarm system as recited in claim 1, wherein said external key buffer circuit means is selectively operable to generate said initial disarming signal in response to a radio transmitted signal.

* * * * *